United States Patent
Kwak

(10) Patent No.: US 8,896,799 B2
(45) Date of Patent: Nov. 25, 2014

(54) LIQUID CRYSTAL DISPLAY INCLUDING CIRCUITRY BETWEEN SEALANTS

(75) Inventor: Yun Hee Kwak, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 158 days.

(21) Appl. No.: 13/617,719

(22) Filed: Sep. 14, 2012

(65) Prior Publication Data

US 2013/0114014 A1     May 9, 2013

(30) Foreign Application Priority Data

Nov. 3, 2011  (KR) .................. 10-2011-0113925

(51) Int. Cl.
| | |
|---|---|
| *G02F 1/1339* | (2006.01) |
| *G02F 1/1333* | (2006.01) |
| *G09G 3/30* | (2006.01) |
| *G09G 3/36* | (2006.01) |
| *G02F 1/1345* | (2006.01) |

(52) U.S. Cl.
CPC .......... *G02F 1/1339* (2013.01); *G02F 1/13454* (2013.01)
USPC ............. 349/153; 349/138; 349/190; 345/80; 345/90

(58) Field of Classification Search
CPC ... G02F 1/1339; G02F 1/1341; G02F 1/1345; G02F 1/133345; G02F 1/136227; G02F 1/133512; G02F 2001/13415; G09G 2300/0842; G09G 3/3233; G09G 2300/089; G09G 3/3648; G09G 3/3614; G09G 3/3659
USPC ....................... 349/153, 190, 138; 345/80, 90
See application file for complete search history.

(56) References Cited

U.S. PATENT DOCUMENTS

| | | | |
|---|---|---|---|
| 6,731,369 B2 | 5/2004 | Choo | |
| 6,771,328 B2 | 8/2004 | Park et al. | |
| 2008/0018221 A1 | 1/2008 | Egen et al. | |
| 2008/0048260 A1 | 2/2008 | Park et al. | |
| 2010/0045916 A1* | 2/2010 | Kim et al. | 349/138 |
| 2010/0045920 A1* | 2/2010 | Kwak et al. | 349/153 |

FOREIGN PATENT DOCUMENTS

| | | |
|---|---|---|
| JP | 2011-017821 | 1/2011 |
| JP | 2011-017822 | 1/2011 |
| KR | 100643561 | 11/2006 |
| KR | 1020070052173 | 5/2007 |
| KR | 1020080003114 | 1/2008 |
| KR | 1020110076654 | 7/2011 |

* cited by examiner

*Primary Examiner* — Mike Qi
(74) *Attorney, Agent, or Firm* — H.C. Park & Associates, PLC

(57) ABSTRACT

A liquid crystal display includes a first substrate, a second substrate, a first sealant, a second sealant, and a gate driving circuit portion. The second substrate faces the first substrate. The first substrate and the second substrate have a display area and a peripheral area peripherally about the display area. The second sealant is spaced apart from the first sealant. The second sealant is disposed in the peripheral area. The gate driving circuit portion is disposed on the first substrate and between the first sealant and the second sealant.

30 Claims, 8 Drawing Sheets

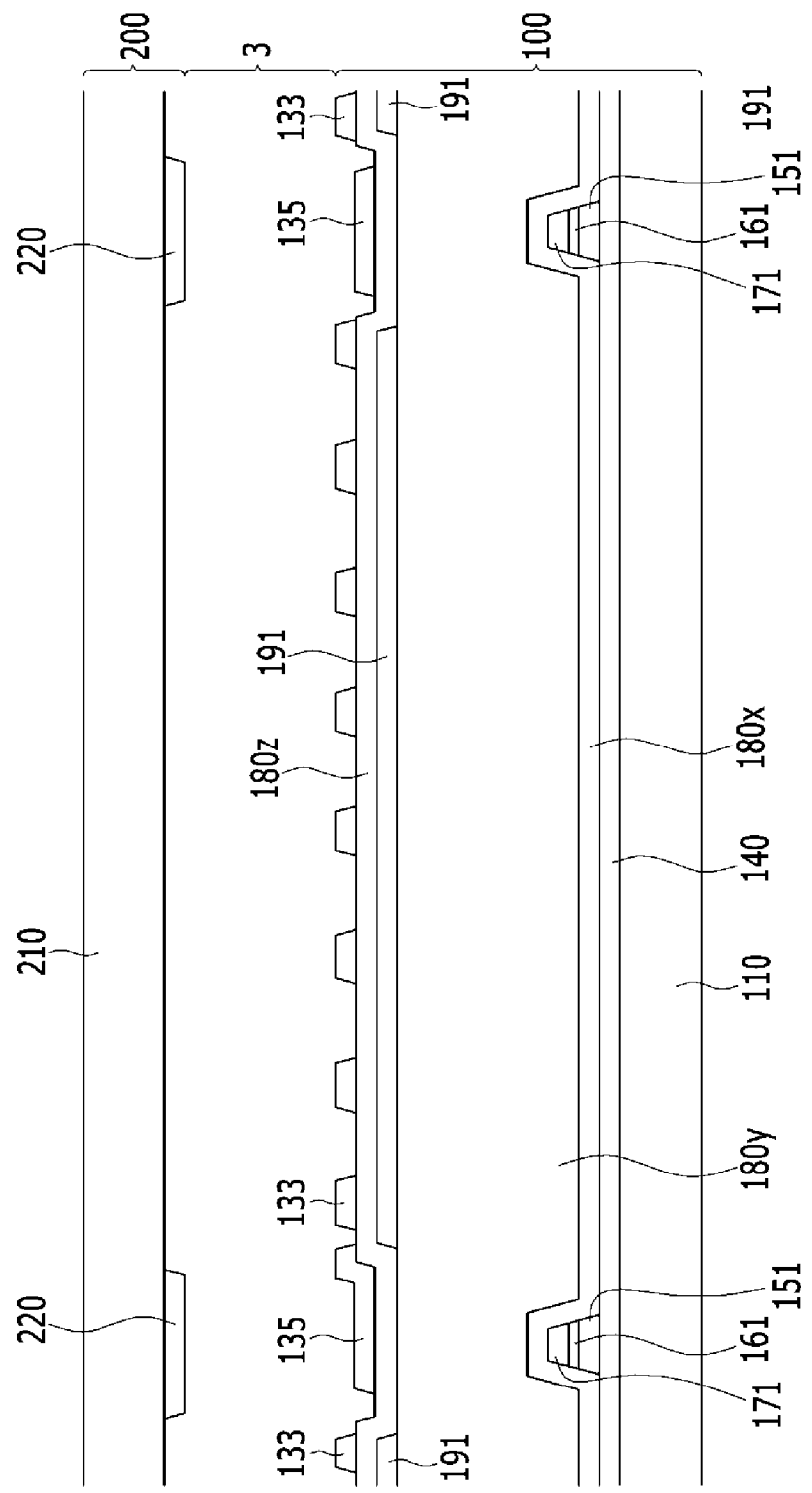

LIQUID CRYSTAL DISPLAY INCLUDING CIRCUITRY BETWEEN SEALANTS

CROSS-REFERENCE TO RELATED APPLICATION

This application claims priority from and the benefit of Korean Patent Application No. 10-2011-0113925, filed on Nov. 3, 2011, which is hereby incorporated by reference for all purposes as if fully set forth herein.

BACKGROUND

1. Field

The present invention relates to display technologies, and more particularly to liquid crystal display technologies.

2. Discussion

Conventional liquid crystal displays, which are one of the most common forms of flat panel display technologies, typically include two display panel substrates upon which field generating electrodes, such as one or more pixel electrodes and a common electrode, are disposed. In this manner, a liquid crystal layer may be disposed between the two display panel substrates. Voltage applied to the field generating electrodes imposes an electric field on the liquid crystal layer, which orients the direction of liquid crystal molecules of the liquid crystal layer. As such, the polarization of incident light may be controlled for the presentation, e.g., display, of images via the liquid crystal display. Typically, the electric field is generated via the pixel electrode(s) and the common electrode, which may be disposed on a thin film transistor array panel.

As the size of conventional liquid crystal displays increase, a sealant utilized to couple a lower panel with an upper panel of such liquid crystal displays may become stressed and, thereby, damaged, resulting in undesirable defects and reliability issues.

Therefore, there is a need for an approach that provides more reliable, cost effective liquid crystal display technology.

SUMMARY

An advantage of the disclosed exemplary embodiments is display technology capable of preventing, or at least minimizing, damage to one or more panel sealants.

Another advantage of the disclosed exemplary embodiments is display technology capable of preventing, or at least minimizing, circuit corrosion correlated with sealant damage.

Additional advantages and other features of the disclosed exemplary embodiments will be set forth in the detailed description which follows and, in part, will be apparent to those having ordinary skill in the art upon examination of the following or may be learned from the practice of the disclosed exemplary embodiments. The advantages of the disclosed exemplary embodiments may be realized and obtained as particularly pointed out in the appended claims.

According to one exemplary embodiment, a liquid crystal display includes a first substrate, a second substrate facing the first substrate, the first substrate and the second substrate comprising a display area and a peripheral area peripherally about the display area, a first sealant, a second sealant spaced apart from the first sealant, the second sealant being disposed in the peripheral area, and a gate driving circuit portion disposed on the first substrate and between the first sealant and the second sealant.

According to another exemplary embodiment, a liquid crystal display includes a first substrate, a second substrate facing the first substrate, the first substrate and the second substrate comprising a display area and a peripheral area peripherally about the display area, a first field generating electrode disposed in the display area of the first substrate, a first insulating layer disposed on the first field generating electrode, a first contact hole, a second contact hole, a first driving signal line disposed in the peripheral area of the first substrate, at least a portion of the first driving signal line being exposed by the first contact hole, a second driving signal line disposed in the peripheral area of the first substrate, at least a portion the second driving signal line being exposed by the second contact hole, and a connecting member covering the first contact hole and the second contact hole, wherein the connecting member is disposed on a same layer as the first field generating electrode, and wherein the first insulating layer covers the connecting member.

According to a further exemplary embodiment, a liquid crystal display includes at least two spaced apart substrates comprising a display area and a peripheral area, a first sealant disposed between the at least two spaced apart substrates, the first sealant bounding the display area, a second sealant spaced apart from the first sealant and disposed between the at least two spaced apart substrates, the second sealant being further disposed in the peripheral area, and at least one circuit portion enclosed in a region disposed between the first sealant and the second sealant.

An exemplary embodiment of the present invention provides a liquid crystal display, including: a first substrate and a second substrate including a display area and a peripheral area around the display area and facing each other; a first sealant and a second sealant disposed in the peripheral area of the first insulation substrate and the second insulation substrate and spaced apart from each other; and a gate driving circuit portion formed on the first insulation substrate and disposed between the first sealant and the second sealant.

An area between the first substrate and the second substrate which is disposed between the first sealant and the second sealant may be vacuous or filled with air.

A liquid crystal layer may be filled between the first substrate and the second substrate which are surrounded by the first sealant.

The liquid crystal display may further include: a first insulating layer disposed in the display area of the first substrate and disposed on a first field generating electrode; a first driving signal line exposed through a first contact hole and a second driving signal line exposed through a second contact hole, which are disposed on the gate driving circuit portion; and a connecting member covering the first contact hole and the second contact hole, in which the connecting member may be covered with the first insulating layer.

An electrode member may be disposed on the first insulating layer covering the connecting member.

The liquid crystal display may further include: a second field generating electrode disposed on the first insulating layer and overlapping the first field generating electrode and the electrode member may be formed on the same layer as the second field generating electrode.

The liquid crystal display may further include: a second insulating layer disposed below the first insulating layer, in which the first driving signal line and the second driving signal line may be disposed below the second insulating layer and the first contact hole and the second contact hole may be formed in the second insulating layer.

The liquid crystal display may further include: a gate line disposed in the display area of the first substrate; a gate insulating layer disposed on the gate line; and a data line disposed on the gate insulating layer. The first driving signal line may be formed on the same layer as the gate line and the second driving signal line may be formed on the data line.

The first contact hole may be formed in the gate insulating layer and the second insulating layer and the second contact hole may be formed in the second insulating layer.

The liquid crystal display may further include: a signal transmission line disposed on the first substrate below the second sealant and transmitting a signal to the gate driving circuit portion.

Another embodiment of the present invention provides a liquid crystal display, including: a first substrate and a second substrate including a display area and a peripheral area around the display area and facing each other; a first field generating electrode disposed in the display area of the first substrate; a first insulating layer disposed on the field generating electrode; a first driving signal line exposed through a first contact hole and a second driving signal line exposed through a second contact hole, which are disposed in the peripheral area of the first substrate; and a connecting member covering the first contact hole and the second contact hole, the connecting member is formed on the same layer as the first field generating electrode, and the connecting member is covered with the first insulating layer.

The liquid crystal display may further include: a first sealant and a second sealant disposed in the peripheral area of the first substrate and spaced apart from each other; and a signal transmission line disposed on the first substrate below the second sealant and transmitting a signal to the first driving signal line and the second driving signal line.

According to exemplary embodiments of the present invention, since the liquid crystal display includes the display area and the peripheral area of the display area and the two sealants spaced apart from each other are disposed in the peripheral area, it is possible to prevent damage of the liquid crystal display due to damage of the sealant, even though the liquid crystal display increases in size and since the exposed portions of the wires of the circuit portion disposed between the two sealants are covered and protected by an interlayer insulating layer and the two electrode layers overlapping each other with the interlayer insulating layer interposed therebetween, it is possible to electrically connect the wires of the circuit portion and prevent corrosion of the wires of the circuit portion exposed through the contact holes.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate various exemplary embodiments of the invention, and together with the description serve to explain principles of the invention.

FIG. 8 is a cross-sectional view of the liquid crystal display of FIG. 7 taken along sectional line VIII-VIII, according to an exemplary embodiment.

DETAILED DESCRIPTION

Figure 1:
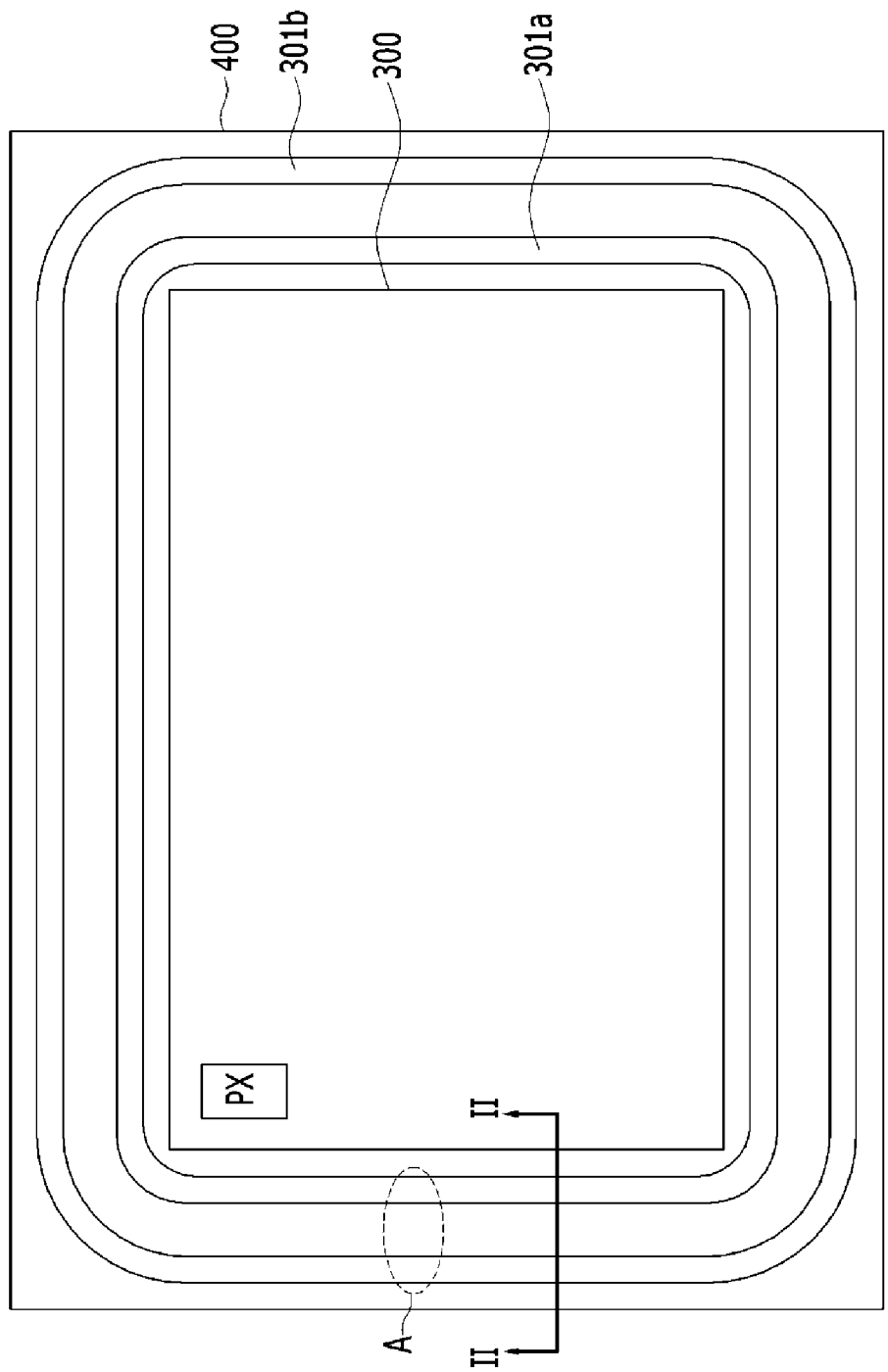
FIG. 1 is a layout view of a liquid crystal display, according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers and/or regions may be exaggerated for clarity and descriptive purposes. Also, like reference numerals denote like elements.

When an element or layer is referred to as being "on" or "connected to" another element or layer, it may be directly on or directly connected to the other element or layer, or intervening elements or layers may be present. When, however, an element is referred to as being "directly on" or "directly connected to" another element or layer, there are no intervening elements or layers present. For the purposes of this disclosure, "at least one of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by the use of these terms. These terms are only used to distinguish one element, component, region, layer or section from another element, component, region, layer or section. Thus, a first element, component, region, layer or section that is discussed below could be termed a second, third, etc., element, component, region, layer or section without departing from the teachings of the present invention.

Spatially relative terms, such as "beneath", "below", "lower", "above", "upper" and the like, may be used herein for descriptive purposes and, thereby, to describe one element or feature's relationship to another element(s) or feature(s) as illustrated in the drawings. It will be understood that spatially relative terms are intended to encompass different orientations of an apparatus in use and/or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein are to be interpreted accordingly.

The terminology used herein is for the purpose of describing particular embodiments only and is not intended to be limiting. As used herein, the singular forms "a", "an" and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to cross-sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this invention is a part. Terms, such as those defined in commonly used dictionaries, should be interpreted as having a meaning that is consistent with their meaning in the context of the relevant art and will not be interpreted in an idealized or overly formal sense unless expressly defined as such herein.

Although various exemplary embodiments are described with respect to liquid crystal displays, it is contemplated that various exemplary embodiments are also applicable to other equivalent flat panel display technologies, such as light emitting diode (LED) displays, organic light emitting diode displays (OLED), plasma displays (PD), etc.

Figure 2:
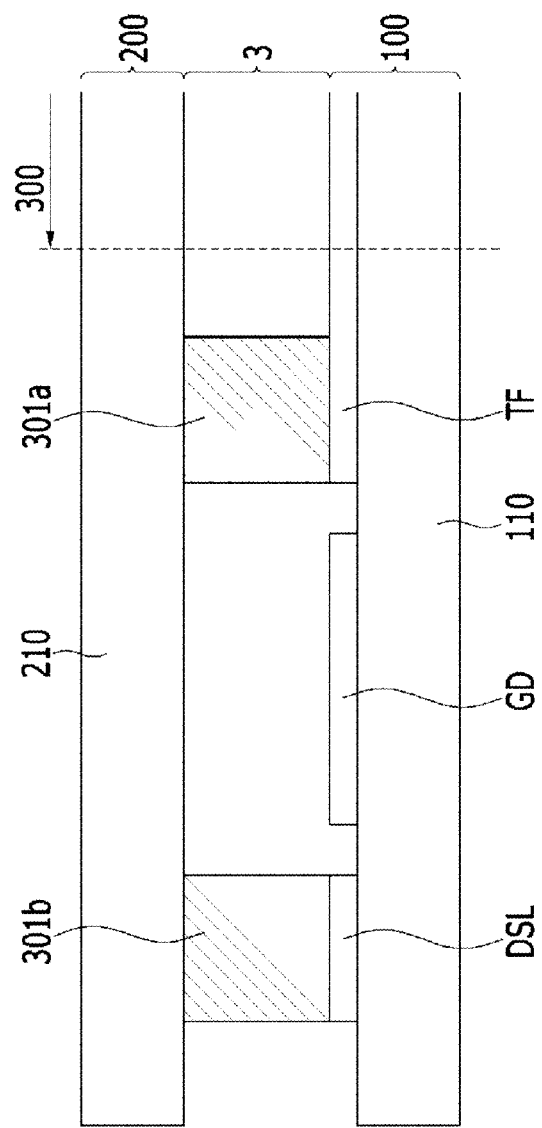
FIG. 2 is a cross-sectional view of the liquid crystal display of FIG. 1 taken along sectional line II-II, according to an exemplary embodiment.

FIG. 1 is a layout view of a liquid crystal display, according to an exemplary embodiment. FIG. 2 is a cross-sectional view of the liquid crystal display of FIG. 1 taken along sectional line II-II.

As seen in the illustrated exemplary embodiment, the liquid crystal display may include one or more regions (or areas), such as display area 300 and peripheral area 400 disposed peripherally about (or around) display area 300.

Display area 300 may be configured to include one or more pixels, such as pixel PX, which may be configured to present, e.g., display, one or more images.

Peripheral area 400 may be configured to peripherally surround display area 300, as well as configured to include one or more sealants, such as first sealant 301a and second sealant 301b spaced apart from first sealant 301a. It is noted that peripheral area 400 will be described below in more detail in association with FIGS. 3 and 4.

Gate driver GD, e.g., a circuit portion of the liquid crystal display, may be disposed between first sealant 301a and second sealant 301b. Further, one or more driving signal transmission lines DSL configured to transmit at least one driving signal to gate driver GD may be disposed below second sealant 301b.

According to one embodiment, first sealant 301a and second sealant 301b may be disposed on thin film transistor array panel 100. It is contemplated; however, that first sealant 301a and second sealant 301b may be disposed on upper panel 200 and, thereby, configured to face thin film transistor array panel 100. In either instance, upper panel 200 may be coupled to thin film transistor array panel 100 via, for example, first sealant 301a and second sealant 301b. It is contemplated, however, that one or more other sealants and/or coupling agents (or devices) may be utilized to couple upper panel 200 to thin film transistor array panel 100. For instance, while only two sealants are illustrated, i.e., first sealant 301a and second sealant 301b, it is contemplated that any number of additional or other sealants may be provided, such as one or more intervening sealants disposed between first sealant 301a and second sealant 301b.

Display area 300 may, in certain exemplary embodiments, include thin film structure TF, such as a signal line, as well as include one or more field generating electrodes (not shown) and/or one or more thin film transistors (not illustrated). Liquid crystal layer 3 may be disposed between thin film transistor array panel 100 and upper panel 200, as well as disposed at least within display area 300. In this manner, first sealant 301a may be configured to bound liquid crystal layer 3 to a region corresponding to at least a portion of display area 300.

According to various exemplary embodiments, liquid crystal layer 3 may kept from a region (or area) defined between first sealant 301a and second sealant 301b where gate driver GD may be disposed. In certain exemplary embodiments, first sealant 301a and second sealant 301b may hermetically seal region 4 from external environmental factors (or forces), such as humidity, moisture, temperature, and the like. It is also noted that this region may be vacuous or filled with one or more gases, such as air. As such, this region may be positively or negatively pressurized.

Figure 3:
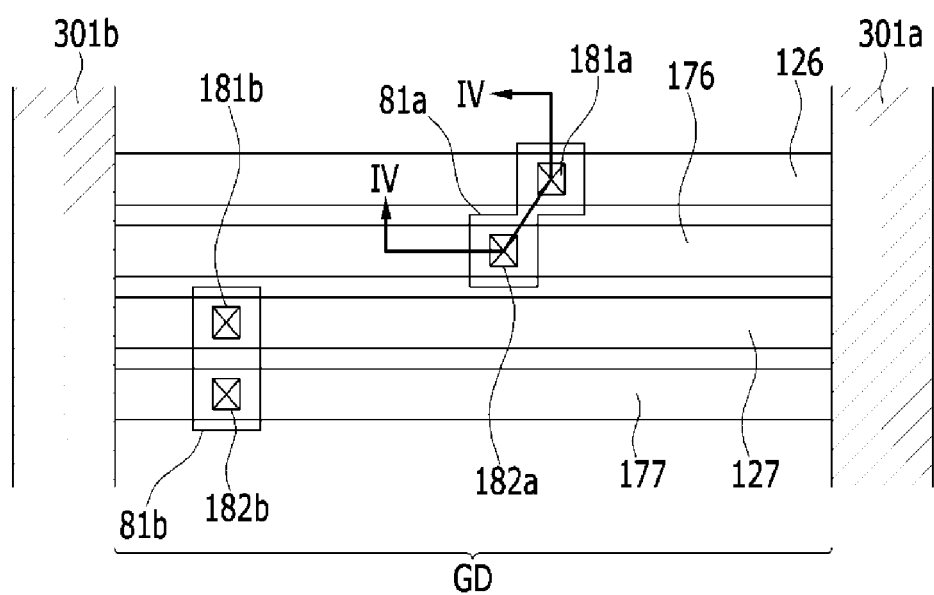
FIG. 3 is a schematic layout view of portion A of the liquid crystal display of FIG. 1, according to an exemplary embodiment.
Figure 4:
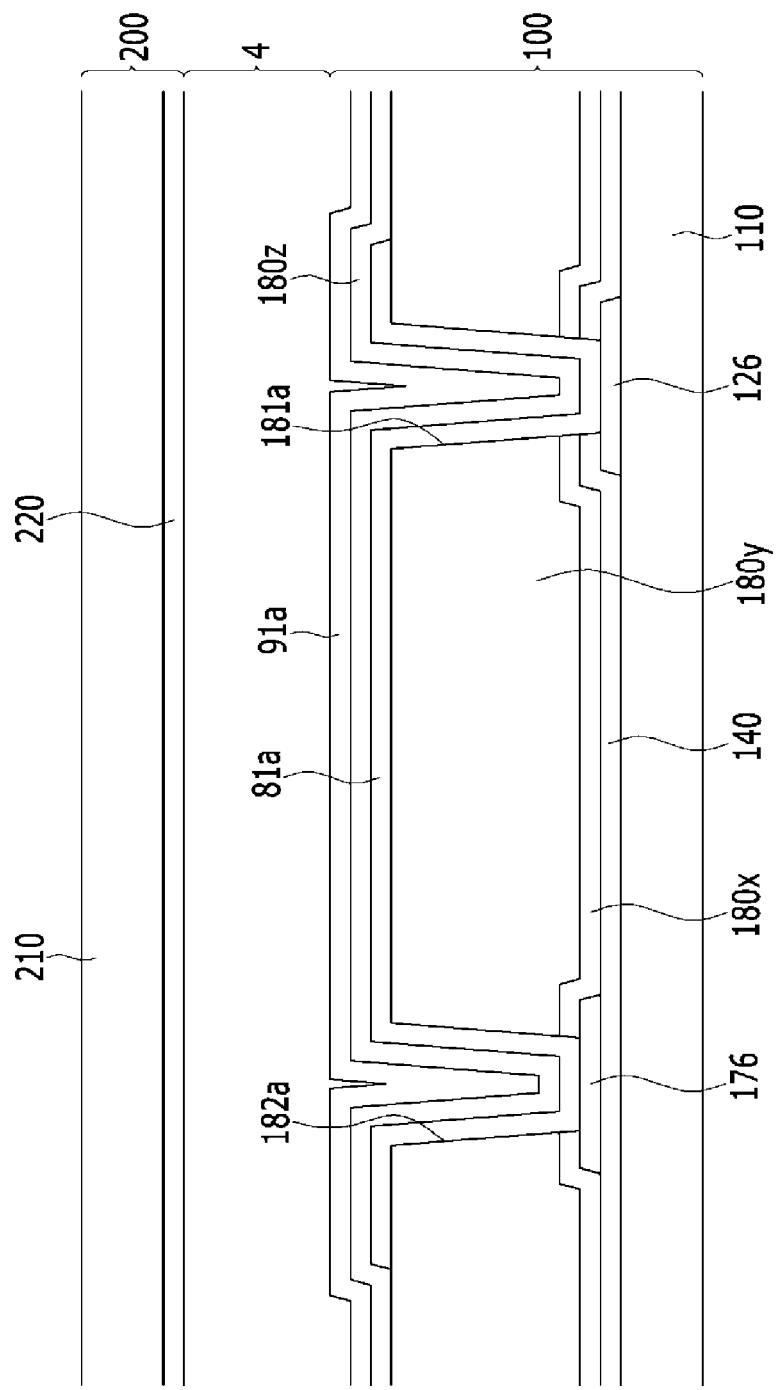
FIG. 4 is a cross-sectional view of the liquid crystal display of FIG. 3 taken along sectional line IV-IV, according to an exemplary embodiment.

Adverting to FIGS. 3 and 4, peripheral area 400 will now be described in more detail. FIG. 3 is a schematic layout view of portion A of the liquid crystal display of FIG. 1, according to an exemplary embodiment. FIG. 4 is a cross-sectional view of the liquid crystal display of FIG. 3 taken along sectional line IV-IV.

As shown in the illustrated exemplary embodiment, peripheral area 400 may be configured to include first sealant 301a, second sealant 301b spaced apart from first sealant 301a, and gate driver GD disposed between first sealant 301a and second sealant 301b. While not illustrated, one or more driving signal transmission lines (DSL) configured to transmit at least one driving signal to gate driver GD may be disposed below second sealant 301b. In certain exemplary embodiments, second sealant 301b may define or be disposed at (or near) a periphery of peripheral area 400.

As previously mentioned, liquid crystal layer 3 may be kept from region (or area) 4, which is disposed between thin film transistor array panel 100 and upper panel 200, and extends (or disposed) between first sealant 301a and second sealant 301b. Gate driver GD may be disposed on thin film transistor array panel 100 and, thereby, within region 4. Further, region 4 may be hermetically sealed and may be vacuous or filled with one or more gases, such as air. As such, region 4 may be positively or negatively pressurized.

Gate driver GD may be configured to include one or more driver gate wires, such as gate driver wires 126 and 127, one or more driver data wires, e.g., driver data wires 176 and 177, and one or more transistors (not shown).

Figure 5:
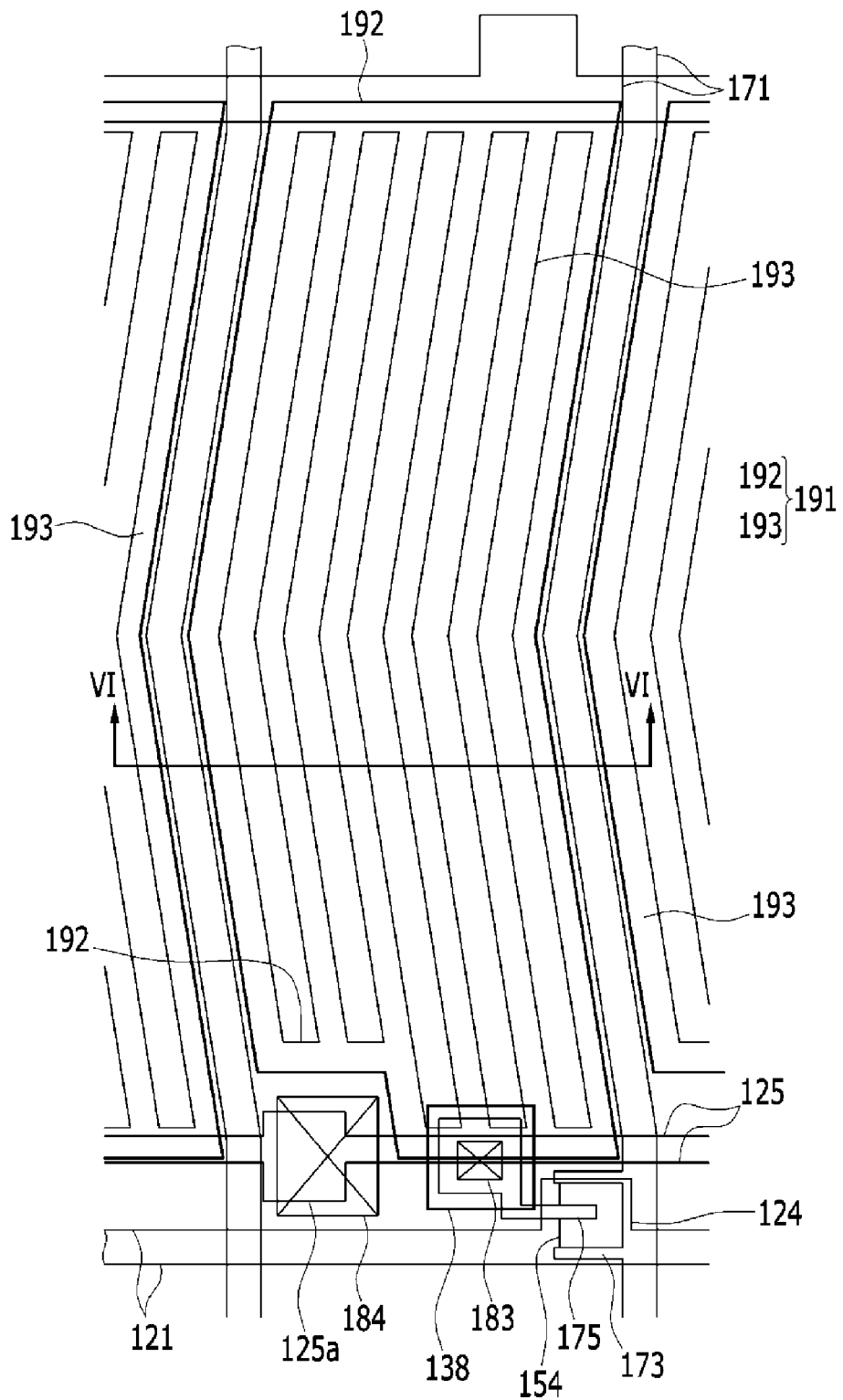
FIG. 5 is a layout view of an exemplary pixel of a liquid crystal display, according to an exemplary embodiment.

Driver gate wires 126 and 127 may be manufactured from (or include) the same gate conductor material as the gate lines (not shown), which are described in more detail in association with FIG. 5. Driver data wires 176 and 177 may be manufactured from (or include) the same data conductor material as the data lines (not illustrated), which are also described in more detail in conjunction with FIG. 5.

Adverting momentarily to FIG. 4, driver gate wires 126 and 127 may be, according to certain exemplary embodiments, manufactured from at least one gate conductor material disposed on insulation substrate 110. Gate insulating layer 140 may be disposed on driver gate wires 126 and 127. Driver data wires 176 and 177 may be disposed on gate insulating layer 140.

According to one exemplary embodiment, first passivation layer 180x may be disposed on driver data wires 176 and 177, as well as disposed on gate insulating layer 140. Second passivation layer 180y may be disposed on first passivation layer 180x. First contact hole (or via) 181a and second contact hole (or via) 181b may be configured to expose at least a portion of driver gate wires 126 and 127. In this manner, first contact hole 181a and second contact hole 181b may be configured to extend through first passivation layer 180x, second passivation layer 180y, and gate insulating layer 140. Third contact hole (or via) 182a and fourth contact hole (or via) 182b may be configured to expose at least a portion of driver data wires 176 and 177. Accordingly, third contact hole 182a and fourth contact hole 182b may be configured to extend through first passivation layer 180x and second passivation layer 180y.

The corresponding portions of driver gate wire 126 and driver data wire 176 that are respectively exposed by first contact hole 181a and third contact hole 182a may be connected via first connecting member 81a. In certain exemplary embodiments, first connecting member 81a may be configured to cover first contact hole 181a and third contact hole 182a. The corresponding portions of driver gate wire 127 and driver data wire 177 that are respectively exposed by second contact hole 181b and fourth contact hole 182b may be connected via second connecting member 81b. As such, second connecting member 81b may be configured, in various exemplary embodiments, to cover second contact hole 181b and fourth contact hole 182b.

According to various exemplary embodiments, first connecting member 81a and second connecting member 81b may be disposed on a same layer as any one of the aforementioned field generating electrodes.

Third passivation layer 180z may be disposed on first connecting member 81a and second connecting member 81b. In this manner, dummy electrode layer 91a may be formed on a same layer as certain other ones of the aforementioned field generating electrodes. Dummy electrode 91a may be disposed on third passivation layer 180z.

Accordingly, the spaced apart configuration of first sealant 301a and second sealant 301b enables the liquid crystal display to be increased in size, while at the same time, prevents damage to the liquid crystal display if one of the sealants, such as second sealant 301b, becomes damaged.

The spaced apart configuration of first sealant 301a and second sealant 301b also provides a buffering region that insulates one or more interior regions and/or components of the liquid crystal display from external environmental factors. In other words, because contact holes 181a, 181b, 182a, and 182b, which respectively provide access to corresponding portions of wires 126, 127, 176, and 177 that are disposed between first sealant 301a and second sealant 301b, are sealed (e.g., hermetically sealed) within region 4, electrical connections facilitated by contact holes 181a, 181b, 182a, and 182b can be protected from, not only, external environmental factors, but also from the degradation effects associated with the external environmental factors, such as the corrosive effects of moisture. Moreover, because contact holes 181a, 181b, 182a, and 182b can be further covered and, thereby, protected by one or more of connecting members 81a and 81b, which are disposed on the same layer as any one of the aforementioned field generating electrodes. In this manner, third passivation layer 180z configured as an interlayer insulating layer disposed between at least two field generating electrodes and dummy electrode layer 91a, which is disposed on a same layer as certain other ones of the aforementioned field generating electrodes, may also serve to cover and, thereby, protect contact holes 181a, 181b, 182a, and 182b from external environmental factors and degradation effects associated therewith. As such, wires 126, 127, 176, and 177 may establish respective electrical connections on and between various layers and, therefore, may be further protected from external environmental factors and degradation effects associated therewith.

Although only two sealants, e.g., first sealant 301a and second sealant 301b have been described and illustrated in association with various exemplary embodiments, it is contemplated that any number of sealants may be provided, such as one or more intervening sealants disposed between first sealant 301a and second sealant 301b.

Figure 6:
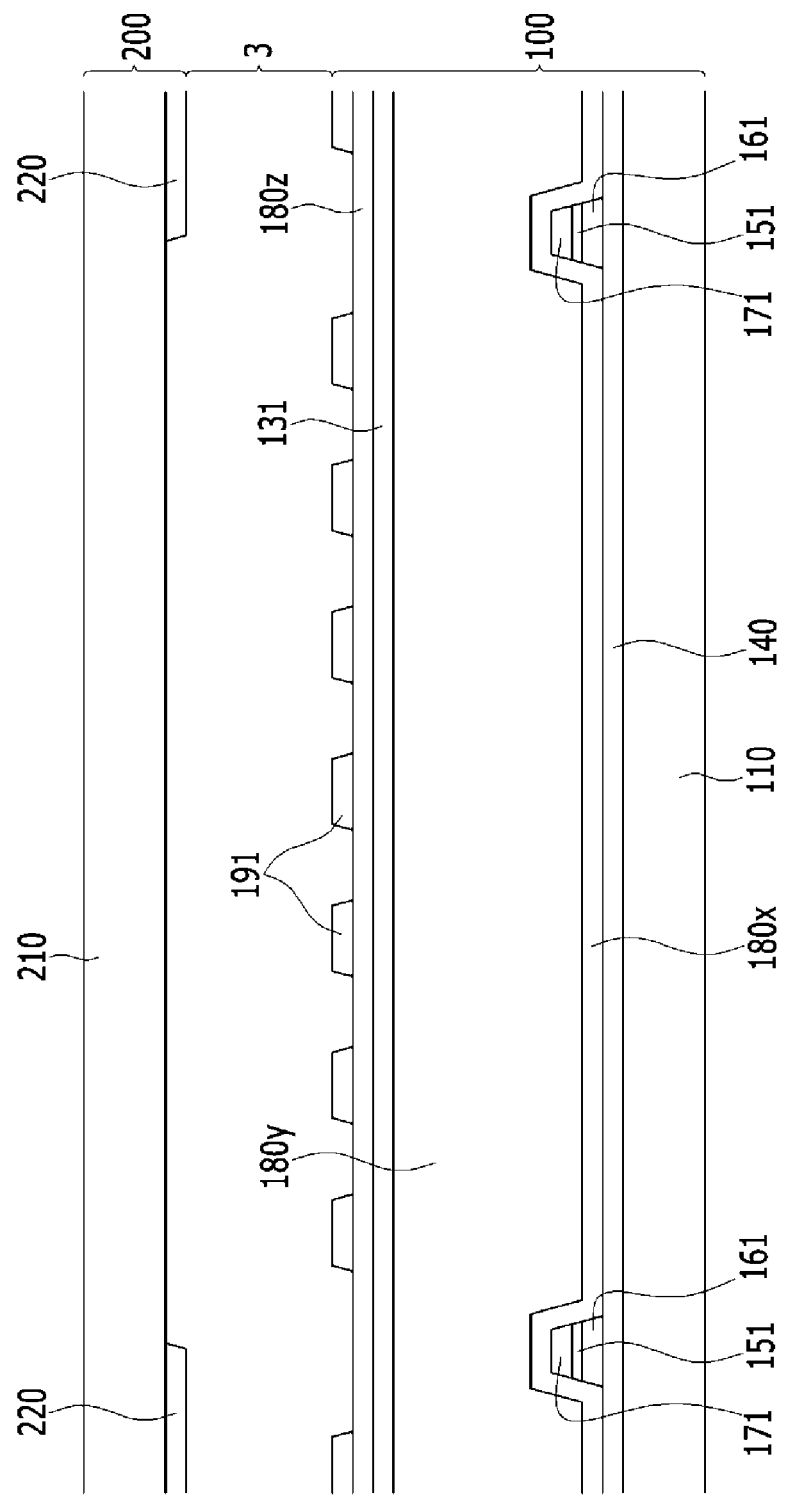
FIG. 6 is a cross-sectional view of the liquid crystal display of FIG. 5 taken along sectional line VI-VI, according to an exemplary embodiment.

Adverting to FIGS. 5 and 6, an exemplary pixel of a liquid crystal display will now be described in more detail. FIG. 5 is a layout view of an exemplary pixel of a liquid crystal display, according to an exemplary embodiment. FIG. 6 is a cross-sectional view of the liquid crystal display of FIG. 5 taken along sectional line VI-VI.

As shown, the liquid crystal display includes thin film transistor array panel 100, upper panel 200 facing thin film transistor array panel 100, and liquid crystal layer 3 disposed between thin film transistor panel 100 and upper panel 200.

Thin film transistor array panel 100 will now be described in more detail. In various exemplary embodiments, thin film transistor array panel 100 may be configured to include insulation substrate 110 upon which one or more gate conductors having one or more gate lines 121 may be disposed. One or more common voltage lines 125 are also disposed on insulation substrate 110.

Gate lines 121 may be configured to include corresponding gate electrodes, such as gate electrode 124, which are configured to protrude downward therefrom.

Common voltage lines 125 extend in a substantially horizontal direction that, in certain embodiments, may be substantially parallel with a substantially horizontal direction in which corresponding gate lines 121 extend. In this manner, common voltage lines 125 may be configured to transmit (or otherwise transfer) one or more predetermined voltage(s), such as common voltage Vcom, to various components of the liquid crystal display. Common voltage lines 125 may further include one or more extension portions, such as extension portion 125a.

Gate conductors 121 and 125 may be disposed on a single layer or on multiple layers including two or more conductive layers.

Gate insulating layer 140 may be disposed on gate conductors 121 and 125. According to certain exemplary embodiments, gate insulating layer 140 may be manufactured from (or include) one or more suitable inorganic insulators, such as silicon nitride (SiNx), silicon oxide (SiOx), and the like.

One or more semiconductors 151 may be disposed on gate insulating layer 140. Corresponding semiconductors 151 may include one or more extension portions, such as extension portion 154, which extend toward corresponding gate electrodes 124. An ohmic contact 161 may be disposed on one or more of semiconductors 151. According to one exemplary embodiment, the ohmic contact may be disposed on each semiconductor 151. In certain other embodiments, the ohmic contact may be omitted.

A data conductor including one or more data lines, such as data line 171, and one or more drain electrodes, such as drain electrode 175, may be disposed on the ohmic contact 161.

Data lines 171 may be configured to extend in a substantially vertical direction, as well as configured to cross corresponding gate lines 121 and respective common voltage lines 125. Each data line 171 may include one or more source electrodes, such as source electrode 173, which are configured to extend toward corresponding gate electrodes 124. Date lines 171 may be further configured to transmit (or otherwise transfer) data signals to various components of the liquid crystal display.

Respective drain electrodes 175 may be configured to include corresponding rod-shaped end portions facing, with respect to gate electrode 124, corresponding source electrodes 173. Other end portion(s) of respective drain electrodes 175 may be configured to include a relatively large area.

According to various exemplary embodiments, data conductors 171 and 175 may be disposed on (or as) a single layer or multiple layers including two or more conductive layers.

Corresponding sets of gate electrodes 124, source electrodes 173, and drain electrodes 175 may be configured to form respective switching devices, such as, respective thin film transistors (TFT) having corresponding extension portions 154 of respective semiconductors 151. In various exemplary embodiments, semiconductors 151 may have a substantially similar planar shape as data conductors 171 and 175, except for respective channel portions of the corresponding TFTs.

First passivation layer 180x may be disposed on data lines 171, drain electrodes 175, and at least one exposed portion of extension portions 154 of semiconductors 151. First passivation layer 180x may be manufactured from (or include) one or more suitable organic insulating materials, inorganic insulating materials, and/or the like.

Second passivation layer 180y may be disposed on first passivation layer 180x. Second passivation layer 180y may be manufactured from (or include) one or more suitable organic materials, and may be configured to cover corresponding data lines 171. According to certain exemplary embodiments, second passivation layer 180y may have a substantially flat upper surface.

While not illustrated, second passivation layer 180y may, in certain other exemplary embodiments, be configured as a color filter. As such, at least one other layer (not shown) may be disposed on second passivation layer 180y. For example, a TFT array panel may include at least one capping layer disposed on at least one color filter. The capping layer(s) may be configured to prevent exposure of liquid crystal layer 3 to at least one pigment of the color filter(s). In this manner, the capping layer(s) may be manufactured from (or include) one or more suitable insulating materials, such as silicon nitride (SiNx), etc.

Fifth contact hole (or via) 184 may be configured to extend through first passivation layer 180x, second passivation layer 180y, and gate insulating layer 140 and, thereby, configured to expose at least a portion of corresponding common voltage lines 125.

Common electrode 131 may be disposed on second passivation layer 180y. In various exemplary embodiments, common electrode 131 may be manufactured from (or include) one or more transparent conductive materials, such as aluminum zinc oxide (AZO), gallium zinc oxide (GZO), indium tin oxide (ITO), indium zinc oxide (IZO), and/or the like. Common electrode 131 may be electrically connected to corresponding common voltage lines 125 via fifth contact hole 184. As such, common electrode 131 may be configured to receive one or more predetermined voltages, such as common voltage Vcom, from common voltage lines 125. Accordingly, common electrode 131 may be configured as a surface-type common electrode and, as a result, may be disposed on an entire surface of substrate 110. The common electrode 131 has a plurality of openings 138 exposing portions of the drain electrodes 175, respectively.

Third passivation layer 180z may be disposed on common electrode 131. One or more pixel electrodes, such as pixel electrode 191, may be disposed on third passivation layer 180z. Pixel electrodes 191 may be manufactured from (or include) one or more transparent conductive materials, such as AZO, GZO, ITO, IZO, and/or the like.

Sixth contact holes 183 may be configured to extend through first passivation layer 180x, second passivation layer 180y, and third passivation layer 180z and, thereby, configured to expose at least a portion of respective drain electrodes 175. In this manner, corresponding pixel electrodes 191 may be electrically connected to respective drain electrodes 175 via sixth contact hole 183. As such, pixel electrodes 191 may be enabled to receive one or more data voltages via six contact hole 183. Corresponding pixel electrodes 191 may be configured to include one or more branch electrodes, such as branch electrode 193, which respectively extend in a substantially parallel direction. According to one exemplary embodiment, branch electrodes 193 may be spaced apart from one another. In this manner, corresponding lower and upper horizontal portions 192 may be configured to connect respective upper and lower ends of branch electrodes 193. Respective branch electrodes 193 of corresponding pixel electrodes 191 may be disposed, e.g., bent or otherwise formed, along (or in juxtaposition to) respective data lines 171. As such, at least two adjacent branch electrodes 193 of respective pixel electrodes 191 may be configured to overlap common electrode 131, which may be configured as a single, surface-type common electrode.

According to various exemplary embodiments, an electric field may be generated via common electrode 131 and one or more of pixel electrodes 191. For instance, application of at least one data voltage to respective pixel electrodes 191 and application of at least one voltage to common electrode 131, e.g., common voltage Vcom, may be configured to generate an electric field, which may be imposed upon liquid crystal layer 3. The generated electric field may be utilized to control the orientation of liquid crystal molecules of liquid crystal layer 3.

With continued reference to FIGS. 5 and 6, upper panel 200 will now be described in more detail. According to one exemplary embodiment, upper panel 200 includes insulation substrate 210 upon which one or more light blocking members, such as light blocking member 220, may be disposed. While not illustrated, at least one color filter may be disposed on insulation substrate 210. It is noted, however, that in instances when at least one color filter is disposed on second passivation layer 180y, which may be disposed on thin film transistor array panel 100, at least one color filter may not be disposed on upper panel 200, e.g., disposed on insulation substrate 210.

According to one exemplary embodiment, driver gate wires 126 and driver data wires 176 that are disposed in at least a portion of peripheral area 400 of thin film transistor array panel 100 and are exposed by first contact hole 181a and third contact hole 182a, may be connected by first connecting member 81a (shown in FIGS. 3 and 4). Similarly, driver gate wires 127 and driver data wires 177 that are exposed by second contact hole 181b and fourth contact hole 182b may be connected by second connecting member 81b (shown in FIG. 3).

With reference to FIGS. 3-5, first connecting member 81a and second connecting member 81b may be disposed on a same layer as common electrode 131. Third passivation layer 180z may be disposed on first connecting member 81a. Dummy electrode layer 91a may be disposed on a same layer as pixel electrodes 191, which may be disposed on third passivation layer 180z.

According to various exemplary embodiments, common electrode 131 may be disposed below third passivation layer 180z. In certain exemplary embodiments, however, corresponding pixel electrodes 191 may be disposed on third passivation layer 180z, but these pixel electrodes 191 may be disposed below third passivation layer 180z. As such, common electrode 131 may be disposed on third passivation layer 180z. Further, common electrode 131 may be configured to include at least one branch electrode and respective pixel electrodes 191 may be configured to include respective plate-type electrodes. It is noted, however, that common electrode 131 may be alternatively configured as a plate-type electrode and respective pixel electrodes 191 may be configured as corresponding branch electrodes.

Figure 7:
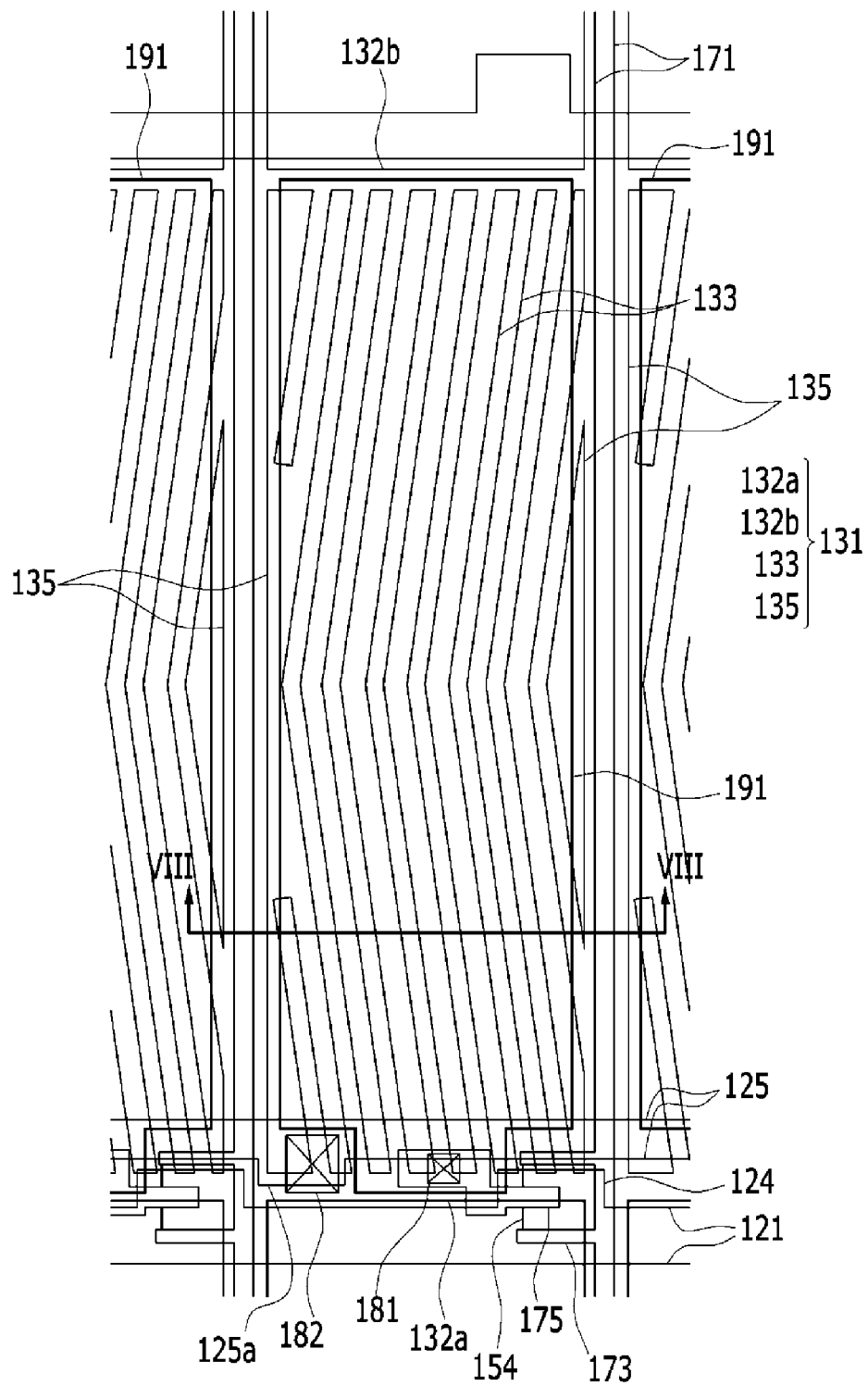
FIG. 7 is a layout view of an exemplary pixel of another liquid crystal display, according to an exemplary embodiment.

Another liquid crystal display according to various other exemplary embodiments will now be described in association with FIGS. 1-3, 7 and 8. FIG. 7 is a layout view of an exemplary pixel of another liquid crystal display, according to an exemplary embodiment. FIG. 8 is a cross-sectional view of the liquid crystal display of FIG. 7 taken along sectional line VIII-VIII.

It is noted that the liquid crystal display illustrated in FIGS. 7 and 8 includes similar constituent components and configurations as the liquid crystal display described in association with FIGS. 1-6. As such, a detailed description of similar constituent components and configurations will be omitted.

With continued reference to FIGS. 1-3, and as seen in FIGS. 7 and 8, a liquid crystal display may be configured to include thin film transistor array panel 100, upper panel 200 facing thin film transistor array 100, and liquid crystal layer 3 disposed between thin film transistor array panel 100 and upper panel 200.

Thin film transistor array panel 100 will now be described in more detail.

According to various exemplary embodiments, thin film transistor array panel 100 may be configured to include insulation substrate 100 upon which a gate conductor including one or more gate lines 121 and one or more common voltage lines 125 may be disposed. Driver gate wires 126 and 127 may also be disposed on insulation substrate 110. While not illustrated, one or more driving signal transmission lines may be disposed below second sealant 301b, and at least a portion of the one or more driving signal transmission lines may be disposed on a same layer as the gate conductor. The driving signal transmission line(s) may be configured to transmit (or otherwise transfer) at least one driving signal to various components of the liquid crystal display.

In various exemplary embodiments, gate insulating layer 140 may be disposed on gate conductors 121, 125, 126, and 127.

One or more semiconductors 151 including corresponding extension portions 154 may be disposed on gate insulating layer 140. One or more ohmic contacts 161 may be disposed on respective semiconductors 151, however, in other exemplary embodiments, the ohmic contact(s) and may be omitted.

A data conductor including one or more data lines 171 and one or more drain electrodes 175 may be disposed on the ohmic contacts 161 and gate insulating layer 140. In this manner, driver data wires 176 and 177 may also be disposed on the ohmic contact(s) and gate insulating layer 140.

First passivation layer 180x may be disposed on driver data wires 176 and 177 and gate insulating layer 140. Second passivation layer 180y may be disposed on first passivation layer 180x.

First contact hole (or via) 181a and second contact hole (or via) 181b may be configured to extend through first passivation layer 180x, second passivation layer 180y, and gate insulating layer 140 and, thereby, configured to expose at least respective portions of driver gate wires 126 and 127. Third contact hole (or via) 182a and fourth contact hole (or via) 182b may be configured to extend through first passivation layer 180x and second passivation layer 180y and, thereby, configured to expose at least respective portions of driver data wires 176 and 177.

Seventh contact hole (or via) 181 may be configured to extend through first passivation layer 180x and second passivation layer 180y and, thereby, configured to expose at least respective portions of corresponding drain electrodes 175. One or more pixel electrodes 191 may be disposed on second passivation layer 180y. Pixel electrodes 191 may be configured as surface-type pixel electrodes that are configured to fill a majority of a region (or area) surrounded by gate lines 121 and data lines 171. As a whole, pixel electrodes 191 may define a polygonal shape exhibiting side regions extending in a substantially parallel direction with an extension direction of gate lines 121 and data lines 171. It is noted that one or more edge regions at a lower side on which thin film transistor array panel 100 is disposed may be chamfered. It is contemplated, however, that the shape of pixel electrodes 191 is not limited to the aforementioned configuration and, thereby, any suitable shape may be utilized. Pixel electrodes 191 may be manufactured from (or include) one or more transparent conductive materials, such as AZO, GZO, ITO, IZO, and/or the like. Pixel electrodes 191 may be configured to receive data voltage(s) from corresponding drain electrodes 175 by way of seventh contact hole 181.

Respective portions of driver gate wires 126 and driver data wires 176 that are exposed by first contact hole 181a and third contact hole 182a may be connected by first connecting member 81a. As such, first connecting member 81a may be configured to cover first contact hole 181a and third contact hole 182a. Corresponding portions of respective driver gate wires 127 and corresponding driver data wires 177 that are exposed by second contact hole 181b and fourth contact hole 182b may be connected by second connecting member 81b. As such, second connecting member 81b may be configured to cover second contact hole 181b and fourth contact hole 182b.

First connecting member 81a and second connecting member 81b may be disposed on a same layer as pixel electrodes 191.

Third passivation layer 180z may be disposed on pixel electrodes 191, first connecting member 81a, and second connecting member 81b. Eighth contact hole 182 may be configured to extend through third passivation layer 180z, second passivation layer 180y, first passivation layer 180x, and gate insulating layer 140. Eighth contact hole 182 may be configured to expose at least respective portions of common voltage lines 125, such as, for example, respective portions of extension portions 125a.

Common electrode 131 and dummy electrode layer 91a may be disposed on a same layer, and may be disposed on third passivation layer 180z. Common electrode 131 and dummy electrode layer 91a may be manufactured from one or more transparent conductive materials, such as AZO, GZO, ITO, IZO, and/or the like.

Common electrode 131 may be configured to include a pair of vertical portions 135 covering corresponding data lines 171. Common electrode 131 may further include one or more branch electrodes 133 disposed between two corresponding vertical portions 135 that are spaced apart from each other, as well as include lower horizontal portion 132a and upper horizontal portion 132b configured to connect respective ends of branch electrodes 133. Vertical portions 135 may be configured in a substantially parallel direction with an extension direction of respective data lines 171. In this manner, vertical portions 135 may be configured to overlap corresponding data lines 171 while, at the same time, covering respective data lines 171. Lower and upper horizontal portions 132a and 132b may be configured to extend in a substantially parallel direction with an extension direction of corresponding gate lines 121. Branch electrodes 133 may be configured to extend in a substantially parallel direction with one another, as well as configured to form respective beveled angles with respect to an extension direction of corresponding gate lines 121. According to certain exemplary embodiments, the bevel angle may be 45 degrees or more. An upper branch electrode and a lower branch electrode may have substantially inversive symmetries with respect to an imaginary horizontal central line of common electrode 131. Adjacent common electrodes 131 may be configured to share a single vertical portion 135 and, thereby, configured to be connected to one another. In this manner, common electrode 131 may be configured to receive at least one predetermined voltage, such as a common voltage Vcom, from respective common voltage lines 125 by way of eighth contact hole 182. Common electrode 131 may be configured to overlap one or more (or all) of pixel electrodes 191. According to one exemplary embodiment, at least two adjacent branch electrodes 133 of respective common electrodes 131 may be configured to overlap a surface-type single pixel electrode 191.

Upper panel 200 will now be described in more detail.

According to various exemplary embodiments, upper panel 200 includes insulation layer 210 upon which one or more light blocking members 220 may be disposed. While not illustrated, at least one color filter may be disposed on insulation substrate 210. In instances when at least one color filter is disposed on second passivation layer 180y, which is disposed on thin film transistor array panel 100, at least one color filter may not be disposed on upper panel 200.

According to one exemplary embodiment, corresponding portions of driver gate wires 126 and driver data wires 176 that are disposed in peripheral area 400 of thin film transistor array panel 100 of the liquid crystal display of FIGS. 7 and 8 and are exposed by first contact hole 181a and third contact hole 182a, may be connected by first connecting member 81a. In this manner, corresponding portions of respective driver gate wires 127 and driver data wires 177 that are exposed by second contact hole 181b and fourth contact hole 182b may be connected by second connecting member 81b.

First connecting member 81a and second connecting member 81b may be disposed on a same layer as pixel electrodes 191. Third passivation layer 180z may be disposed on first connecting member 81a. Dummy electrode layer 91a may be disposed on a same layer as common electrodes 131, which are disposed on third passivation layer 180z.

According to various exemplary embodiments, any one of two field generating electrodes, such as common electrodes 131 and pixel electrodes 191, overlapping one another may be configured as a surface type electrode, while the respective other one of the field generating electrodes has a branch portion. It is contemplated, however, that the liquid crystal displays described herein are applicable to various other similar and/or equivalent types of thin film transistor array panels having at least two field generating electrodes on a single display panel.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid crystal display, comprising:
   a first substrate;
   a second substrate facing the first substrate, the first substrate and the second substrate comprising a display area and a peripheral area peripherally about the display area;
   a first sealant;
   a second sealant spaced apart from the first sealant, the second sealant being disposed in the peripheral area; and
   a gate driving circuit portion disposed on the first substrate and between the first sealant and the second sealant.

2. The liquid crystal display of claim 1, wherein a region disposed between the first sealant and the second sealant is vacuous or filled with one or more gasses.

3. The liquid crystal display of claim 2, further comprising:
   a liquid crystal layer disposed between the first substrate and the second substrate, the liquid crystal layer being surrounded by the first sealant.

4. The liquid crystal display of claim 2, further comprising:
   a first insulating layer disposed in the display area of the first substrate;
   a first field generating electrode disposed on the first insulating layer;
   a first contact hole;
   a second contact hole;
   a first driving signal line disposed on the gate driving circuit portion and exposed by the first contact hole;
   a second driving signal line disposed on the gate driving circuit portion and exposed by the second contact hole; and
   a connecting member covering the first contact hole and the second contact hole,
   wherein the first insulating layer covers the connecting member.

5. The liquid crystal display of claim 4, further comprising:
   an electrode member disposed on the first insulating layer.

6. The liquid crystal display of claim 5, further comprising:
   a second field generating electrode disposed on the first insulating layer and overlapping the first field generating electrode,
   wherein the electrode member is disposed on a same layer as the second field generating electrode.

7. The liquid crystal display of claim 6, further comprising:
   a second insulating layer disposed below the first insulating layer, wherein the first driving signal line and the second driving signal line are disposed below the second insulating layer, and wherein the second insulating layer comprises at least a portion of the first contact hole and the second contact hole.

8. The liquid crystal display of claim 7, further comprising:
a gate line disposed in the display area of the first substrate;
a gate insulating layer disposed on the gate line; and
a data line disposed on the gate insulating layer,
wherein the first driving signal line is disposed on a same layer as the gate line, and
wherein the second driving signal line is disposed on a same layer as the data line.

9. The liquid crystal display of claim 8, wherein the first contact hole extends through the gate insulating layer and the second insulating layer, and the second contact hole extends through the second insulating layer.

10. The liquid crystal display of claim 9, further comprising:
a signal transmission line disposed on the first substrate and below the second sealant, the signal transmission line being configured to transmit a signal to the gate driving circuit portion.

11. The liquid crystal display of claim 4, further comprising:
a second insulating layer disposed below the first insulating layer,
wherein the first driving signal line and the second driving signal line are disposed below the second insulating layer, and
wherein the second insulating layer comprises at least a portion of the first contact hole and the second contact hole.

12. The liquid crystal display of claim 11, further comprising:
a gate line disposed in the display area of the first substrate;
a gate insulating layer disposed on the gate line; and
a data line disposed on the gate insulating layer,
wherein the first driving signal line is disposed on a same layer as the gate line, and
wherein the second driving signal line is disposed on a same layer as the data line.

13. The liquid crystal display of claim 12, wherein the first contact hole extends through the gate insulating layer and the second insulating layer, and the second contact hole extends through the second insulating layer.

14. The liquid crystal display of claim 13, further comprising:
a signal transmission line disposed below the second sealant, the signal transmission line being configured to transmit a signal to the gate driving circuit portion.

15. The liquid crystal display of claim 4, further comprising:
a signal transmission line disposed on the first substrate and below the second sealant, the signal transmission line being configured to transmit a signal to the gate driving circuit portion.

16. The liquid crystal display of claim 2, further comprising:
a signal transmission line disposed on the first substrate and below the second sealant, the signal transmission line being configured to transmit a signal to the gate driving circuit portion.

17. A liquid crystal display, comprising:
a first substrate;
a second substrate facing the first substrate, the first substrate and the second substrate comprising a display area and a peripheral area peripherally about the display area;
a first field generating electrode disposed in the display area of the first substrate;
a first insulating layer disposed on the first field generating electrode;
a first contact hole;
a second contact hole;
a first driving signal line disposed in the peripheral area of the first substrate, at least a portion of the first driving signal line being exposed by the first contact hole;
a second driving signal line disposed in the peripheral area of the first substrate, at least a portion the second driving signal line being exposed by the second contact hole; and
a connecting member covering the first contact hole and the second contact hole,
wherein the connecting member is disposed on a same layer as the first field generating electrode, and
wherein the first insulating layer covers the connecting member.

18. The liquid crystal display of claim 17, further comprising:
a first sealant; and
a second sealant spaced apart from the first sealant and disposed in the peripheral area of the first substrate,
wherein a region disposed between the first sealant and the second sealant is vacuous or filled with one or more gasses.

19. The liquid crystal display of claim 18, further comprising:
a liquid crystal layer disposed between the first substrate and the second substrate, the liquid crystal layer being surrounded by the first sealant.

20. The liquid crystal display of claim 18, further comprising:
an electrode member disposed on the first insulating layer and covering the connecting member.

21. The liquid crystal display of claim 20, further comprising:
a second field generating electrode disposed in the display area of the first substrate and overlapping the first field generating electrode, the first insulating layer being disposed between the first field generating electrode and the second field generating electrode,
wherein the electrode member is disposed on a same layer as the second field generating electrode.

22. The liquid crystal display of claim 21, further comprising:
a second insulating layer disposed below the first insulating layer,
wherein the first driving signal line and the second driving signal line are disposed below the second insulating layer, and
wherein the second insulating layer comprises at least respective portions of the first contact hole and the second contact hole.

23. The liquid crystal display of claim 22, further comprising:
a gate line disposed in the display area of the first substrate;
a gate insulating layer disposed on the gate line; and
a data line disposed on the gate insulating layer,
wherein the first driving signal line is disposed on a same layer as the gate line, and
wherein the second driving signal line is disposed on a same layer as the data line.

24. The liquid crystal display of claim 23, wherein the first contact hole extends through the gate insulating layer and the second insulating layer, and the second contact hole extends through the second insulating layer.

25. The liquid crystal display of claim 18, further comprising:
- a second field generating electrode disposed in the display area of the first substrate and overlapping the first field generating electrode, the first insulating layer being disposed between the first field generating electrode and the second field generating electrode,
- wherein the electrode member is disposed on a same layer as the second field generating electrode.

26. The liquid crystal display of claim 25, further comprising:
- a second insulating layer disposed below the first insulating layer,
- wherein the first driving signal line and the second driving signal line are disposed below the second insulating layer, and
- wherein the second insulating layer comprises respective portions of the first contact hole and the second contact hole.

27. The liquid crystal display of claim 26, further comprising:
- a gate line disposed in the display area;
- a gate insulating layer disposed on the gate line; and
- a data line disposed on the gate insulating layer,
  - wherein the first driving signal line is disposed on a same layer as the gate line, and
  - wherein the second driving signal line is disposed on a same layer as the data line.

28. The liquid crystal display of claim 27, wherein the first contact hole extends through the gate insulating layer and the second insulating layer, and the second contact hole extends through the second insulating layer.

29. The liquid crystal display of claim 18, further comprising:
- a signal transmission line disposed on the first substrate and below the second sealant, the signal transmission line being configured to transmit a signal to the first driving signal line and the second driving signal line.

30. The liquid crystal display of claim 17, further comprising:
- a first sealant;
- a second sealant spaced apart from the first sealant and disposed in the peripheral area of the first substrate; and
- a signal transmission line disposed on the first substrate and below the second sealant, the signal transmission line being configured to transmit a signal to the first driving signal line and the second driving signal line.

* * * * *